(12) United States Patent
Julian et al.

(10) Patent No.: US 7,494,342 B2
(45) Date of Patent: Feb. 24, 2009

(54) APPARATUS AND METHOD FOR DEMONSTRATING THE EFFICACY OF A CONSUMER PRODUCT TO PRODUCE A CONSUMER-DESIRED EFFECT

(75) Inventors: Jennifer C. Julian, Pleasanton, CA (US); Elias A. Shaheen, Pleasanton, CA (US); Alan J. Fujii, Newport Beach, CA (US)

(73) Assignee: The Clorox Company, Oakland, CA (US)

( * ) Notice: Subject to any disclaimer, the term of this patent is extended or adjusted under 35 U.S.C. 154(b) by 540 days.

(21) Appl. No.: 11/252,055

(22) Filed: Oct. 17, 2005

(65) Prior Publication Data

US 2007/0117084 A1    May 24, 2007

(51) Int. Cl.
*G09B 23/24* (2006.01)
(52) U.S. Cl. ........................... 434/298; 434/270
(58) Field of Classification Search ............... 434/276, 434/283, 298, 365, 366, 369, 370, 381, 388, 434/270
See application file for complete search history.

(56) References Cited

U.S. PATENT DOCUMENTS

| | | | | |
|---|---|---|---|---|
| 3,036,894 A | * | 5/1962 | Forestiere | ............... 436/165 |
| 3,474,898 A | * | 10/1969 | Montgomery | ............... 206/219 |
| 3,689,224 A | * | 9/1972 | Agnew | .................. 422/61 |
| 3,713,779 A | * | 1/1973 | Sirago et al. | .................. 422/61 |
| 4,402,402 A | * | 9/1983 | Pike | ............... 206/219 |
| 4,472,145 A | * | 9/1984 | Freeman et al. | ............. 434/298 |
| 5,871,361 A | * | 2/1999 | Gastle et al. | ............... 434/295 |
| 5,944,709 A | * | 8/1999 | Barney et al. | ............... 604/410 |
| 6,254,396 B1 | * | 7/2001 | Stevens | ............... 434/276 |
| 6,300,138 B1 | * | 10/2001 | Gleason et al. | ............. 436/165 |
| 7,344,378 B2 | * | 3/2008 | Ichikawa et al. | ............ 434/283 |
| 2005/0026126 A1 | * | 2/2005 | Hageman | ............. 434/298 |

* cited by examiner

*Primary Examiner*—Kurt Fernstrom
(74) *Attorney, Agent, or Firm*—David Peterson; Erin Collins; Alok Goel

(57) ABSTRACT

Provided is a demonstration apparatus comprising a top subassembly and a bottom subassembly. The top subassembly includes a reservoir adapted to contain a consumer product to be demonstrated. The consumer product has efficacy to produce a consumer-desired effect that is directly or indirectly observable. The bottom subassembly includes a vial containing a contaminant upon which the consumer product produces the consumer-desired effect. The top sub assembly and bottom subassembly are coupled to a reservoir seal element. Upon activation of the demonstration apparatus, the consumer product flows into the bottom subassembly and contacts the contaminant to produce the consumer-desired effect. Also provided, are a method of use for the demonstration apparatus and a kit containing the demonstration apparatus.

21 Claims, 14 Drawing Sheets

# APPARATUS AND METHOD FOR DEMONSTRATING THE EFFICACY OF A CONSUMER PRODUCT TO PRODUCE A CONSUMER-DESIRED EFFECT

BACKGROUND OF THE INVENTION

1. Field of the Invention

This invention relates to informational demonstrations, and more specifically to methods and kits used as an educational and promotional tool for demonstrating the efficacy of a consumer product to produce a consumer-desired effect.

2. Description of the Related Art

Demonstration of products is well known. Many types of products have been demonstrated by a product salesperson or vendor to educate and inform consumers about the characteristics and benefits of the product. Often times a live demonstration is the best way inform and educate. Written materials, video or spoken presentations about the benefits of a product often fail to capture and focus attention on the product's ability to perform a desired function or achieve a desired result.

Consumers have recently become more concerned with the efficacy of their consumer products since these products often provide health, safety, or wellness benefits of interest to consumers. Consumer products particularly lend themselves to live demonstrations of their capacity to produce a consumer-desired effect on a contaminant. Often the consumer-desired effect produced by the consumer product is directly observable by the consumer. Thus, live demonstrations can directly show a consumer the benefits of the consumer product.

In the prior art, a consumer product demonstration involved setting up the demonstration before it was performed by the product salesperson or vendor. The consumer product was often, supplied from its standard packaging container. Workpieces, on which the consumer product acted, also needed to be supplied for the demonstrations. Finally, containers, platforms, and tools necessary for an effective demonstration had to be supplied.

During the demonstration, care was needed to avoid unintended contact with the consumer product or with the contaminant. Cleanup materials often were procured to address potential material spills of the consumer product or the contaminant.

After the demonstration was performed, the consumer product demonstrator needed to break-down the demonstration setup. Unused consumer product remaining in the original packaging and spent workpieces needed to be disposed. Work areas for the demonstration needed to be cleaned or re-ordered, and tools and working containers used in the demonstration needed to be cleaned.

With consumer products, especially those involving cleaning products that produced a consumer-desired effect on a contaminant, these prior art demonstration activities often involved some danger or health risk to both the demonstrator and the consumer observer. These types of consumer products often posses dangerous or unhealthful properties themselves. In a demonstration, use of, or even simple exposure to, these products without proper personal protective equipment, could present danger or health risks to the demonstrator or observers. Further, exposure to the contaminants on which these consumer products act, likewise often posed danger or health risks.

A demonstration apparatus and method to perform demonstrations of consumer products that avoids the disadvantages of the prior art is needed. In accordance with this objective and those that are mentioned and will become apparent below, in one aspect of the present invention a demonstration apparatus is provided.

SUMMARY OF THE INVENTION

In accordance with the principles of the present invention, a demonstration apparatus and method for its use that overcome the disadvantages of prior art demonstration techniques are described. In one embodiment, the demonstration apparatus comprises a top subassembly and a bottom subassembly. The top subassembly includes a reservoir adapted to contain a consumer product to be demonstrated. The consumer product has efficacy to produce a consumer-desired effect that is directly or indirectly observable. The bottom subassembly includes a vial containing a contaminant upon which the consumer product produces the consumer-desired effect. In one embodiment, the contaminant may be placed on a substrate or workpiece contained in the vial.

The top subassembly is coupled to a reservoir seal element in a fluid-tight manner. Likewise, the bottom subassembly is coupled to the reservoir seal element in a fluid tight manner. When assembled, the reservoir seal element forms a seal preventing flow of the consumer product from the reservoir into the vial.

By application of an activation force, the seal formed at the reservoir seal element is withdrawn and the consumer product flows from the reservoir of the top subassembly into the vial of the bottom subassembly. In the vial, the consumer product produces the directly or indirectly observable consumer-desired effect on the contaminant. In one embodiment in accordance with the principles of the present invention, the reservoir is collapsible at activation. In another embodiment, the reservoir is deformable at activation.

After activation, the spent consumer product and contaminant are contained in the vial of the demonstration apparatus and are not exposed to the demonstrator or observers. The entire demonstration apparatus may be easily disposed after use.

In accordance with another objective, in one aspect of the present invention a method for demonstrating the efficacy of a consumer product to produce a consumer-desired effect using the demonstration apparatus is described. The method includes:

assembling and providing the demonstration apparatus;

optionally, educating and informing consumers about the demonstration apparatus, the contaminant, and the observable consumer-desired effect of the consumer product on the contaminant;

optionally, circulating the demonstration apparatus among the consumers before activation;

activating the demonstration apparatus to produce the observable consumer-desired effect on the contaminant;

optionally, circulating the demonstration apparatus among the consumers after activation; and disposing the demonstration apparatus.

In accordance with another objective, in one aspect of the present invention a kit for executing the method described includes:

a plurality of demonstration apparatuses;

optionally, instructions in the use and proper disposal of the demonstration apparatuses;

optionally, a plurality of alternate demonstration apparatuses containing a competing consumer product having lower efficacy to produce the observable consumer-desired effect on the contaminant;

optionally, informational and educational materials;
optionally, promotional materials; and
optionally, consumer product samples.

Further features and advantages of the present invention will become apparent to those of ordinary skill in the art in view of the detailed description of embodiments below.

BRIEF DESCRIPTION OF THE DRAWINGS

Reference will now be made to the drawings wherein like numerals refer to like parts throughout, and wherein.

DETAILED DESCRIPTION

Figure 1A:
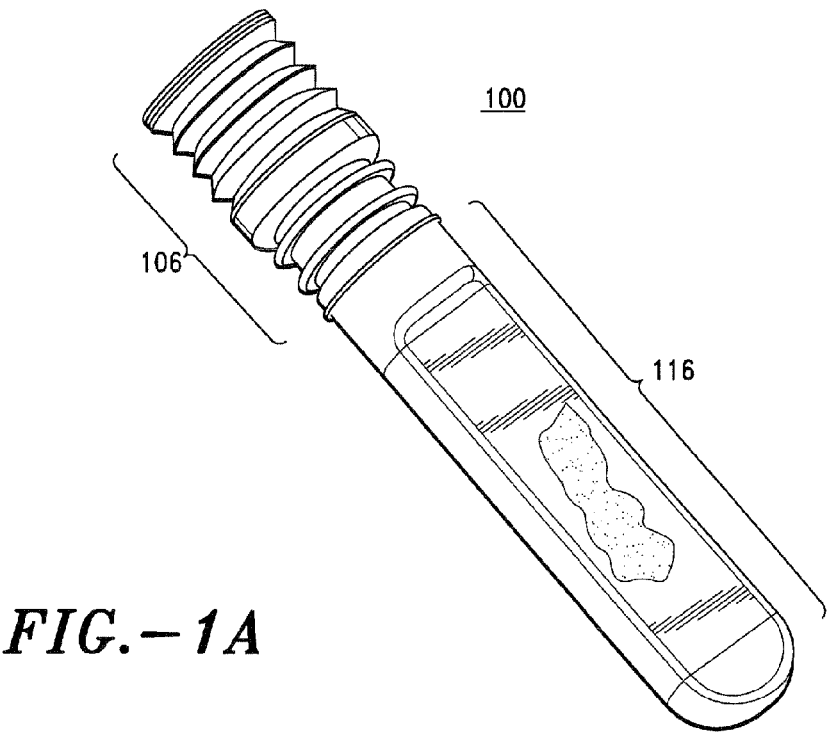
FIG. 1A shows a perspective view of a collapsible demonstration apparatus in accordance with one embodiment of the present invention.

FIG. 1A shows a perspective view of a collapsible demonstration apparatus 100 in accordance with one embodiment of the present invention that houses a workpiece 102 having a contaminant 104 thereon. A contaminant as used herein is a substance that has inherently undesirable or dangerous characteristics or has an undesirable or unhealthful effect on a user.

Collapsible demonstration apparatus 100 comprises a number of components that are assembled prior to use of collapsible demonstration apparatus 100 in a method 1600 (FIG. 16) according to the present invention. Collapsible demonstration apparatus 100 includes a top subassembly 106 configured to contain and dispense a consumer product 208 (FIG. 2A) and a bottom subassembly 116 adapted to couple in a fluid-tight manner with top subassembly 106.

Figure 1B:
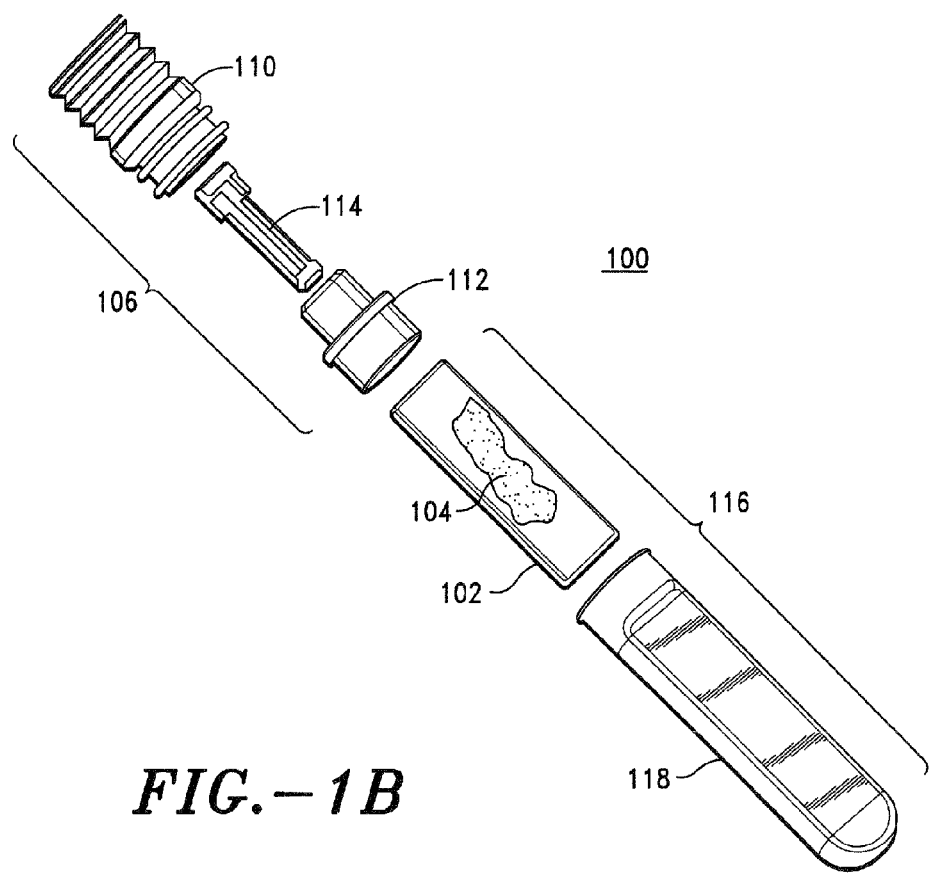
FIG. 1B shows an exploded view of the collapsible demonstration apparatus of FIG. 1A.

FIG. 1B shows an exploded view of collapsible demonstration apparatus 100 of FIG. 1A. In one embodiment, top subassembly 106 comprises a reservoir 110, a stopper 112, adapted to couple in a fluid-tight manner with reservoir 110, and a ejector 114 disposed within reservoir 110 and adapted to slidably engage stopper 112.

Further, bottom subassembly 116 includes a vial 118 configured to contain a workpiece 102 having a contaminant 104 thereon and adapted to couple in a fluid-tight manner with stopper 112. In one embodiment, vial 118 is at least partially transparent or translucent such that workpiece 102 and, more specifically, contaminant 104 thereon, is visible when top subassembly 106 and bottom subassembly 116 are fully assembled to form collapsible demonstration apparatus 100, as described more fully below with reference to FIGS. 1A through 7.

Figure 2A:
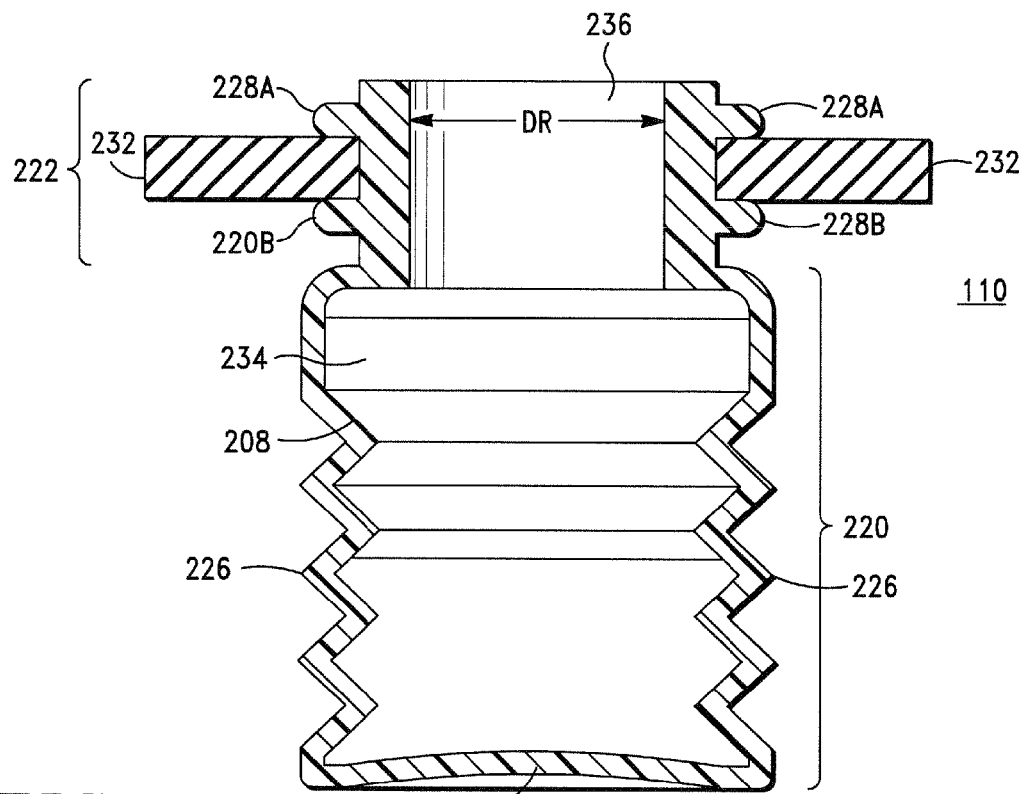
FIG. 2A shows a close-up, isolated, side cross-sectional view of a reservoir of FIGS. 1A and 1B.
Figure 16:
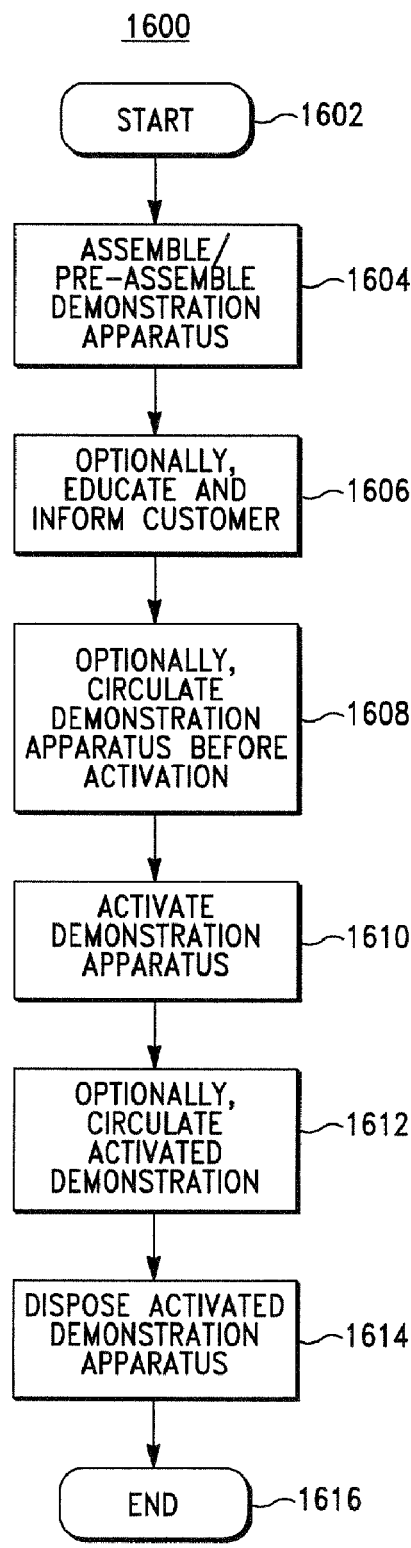
FIG. 16 shows a process flow diagram for a method for demonstrating the efficacy of a consumer product to produce a consumer-desired effect.

FIG. 2A shows a close-up, isolated, side cross-sectional view of reservoir 110 of FIG. 1B. In FIG. 2A, reservoir 110 is shown in a position inverted from the position in which collapsible demonstration apparatus 100 is used with method 1600 (FIG. 16). Reservoir 110 is configured as a hollow vessel adapted to contain a flowable material. As used herein, a material is said to be flowable material if it is a liquid or a granular or powdered solid capable of movement through an opening or is a gas capable of defusing through an opening.

Referring to FIGS. 1A, 1B and 2A together, in one embodiment, reservoir 110 defines a generally cylindrically shaped surface closed at a first end and opened at an opposed second end. Reservoir 110 includes a collapsible portion 220 and a stopper top coupling portion 222 coupled to or integral with collapsible portion 220.

Collapsible portion 220 of reservoir 110 includes endcap 224 and a collapsible sidewall 226 coupled to or integral with endcap 224. Endcap 224 is configured generally as a flattened area or disk shaped structure upon which force may be applied by a user. Collapsible sidewall 226 is configured generally as the surface of the cylindrically shaped collapsible portion 220. Endcap 224 is deflectable in the direction of stopper top coupling portion 222 by application of a force on endcap 224 toward stopper top coupling portion 222. In one embodiment, collapsible sidewall 226 further forms a compressible, bellows-like structure that compresses to accommodate the deflection of endcap 224 toward stopper top coupling portion 222.

Stopper top coupling portion 222 of reservoir 110 is configured generally as a cylindrically shaped surface opened at both ends. One end of stopper coupling portion 222 is coupled to or integral with collapsible portion 220 and the other end of stopper coupling portion 222 defines a reservoir opening 236 of stopper 112. Reservoir opening 236 has a reservoir opening diameter DR.

In assembling the components of collapsible demonstration apparatus 100, reservoir 110 is inverted, i.e., reservoir opening 236 is positioned upwardly above endcap 224 as shown in FIG. 2A, and partially filled with consumer product 208. A pair of vertically spaced apart rings circumscribe stopper top coupling portion 222. First ring 228A and second ring 228B together define a slotted track 230 around top coupling portion 222. In one embodiment, during assembly and filling of top subassembly 106, slotted track 230 provides support and alignment for inverted reservoir 110 when it is temporarily inserted into an assembly rib structure 232. Other structures are possible for holding reservoir 110 in an inverted position during filling and coupling to stopper 112. After reservoir 110 is partially filled with consumer product 208, a reservoir expansion space 234 remains in reservoir 110.

Consumer product 208 has efficacy to produce a consumer-desired effect on contaminant 104. A consumer-desired effect is an effect on contaminant 104 that is materially beneficial to the consumer and which favorably effects the consumer's decision to purchase consumer product 208. For example, consumer product 208 may eliminate, reduce, denature, minimize, or otherwise render harmless the undesirable or dangerous properties of contaminant 104 thereby producing a consumer-desired effect. Further, consumer product 208 produces a humanly observable sensory effect that demonstrates the efficacy of consumer product 208 to produce a consumer-desired effect on contaminant 104.

In one embodiment, the efficacy of consumer product 208 to decontaminate workpiece 102 is demonstrated by producing a visual effect on contaminant 104. For example, consumer product 208 may be an oxidizing agent, such as a hypochlorite solution like TILEX® by The Clorox Company, contaminant 104 may be a mold stain, and workpiece 102 may be a substrate, such as hardened grout or porous and non-porous synthetic film, bearing the mold stain contaminant 104. Upon activation, the hypochlorite consumer product 208 produces the consumer-desirable effect of bleaching-out the mold stain contaminant 104. The hypochlorite consumer product 208 oxidizes and denatures the mold stain contaminant 104 on substrate workpiece 102 to produce the visible effect of eliminating mold stain contaminant 104. In other examples, consumer product 102 may produce an auditory, olfactory, tactile, or other sensory effect after contacting contaminant 104 to demonstrate the efficacy of consumer product 208 to produce a consumer-desired effect on contaminant 104.

In other embodiments, contaminant 104 need not be contained on workpiece 108. For example, consumer product 208 may be a drain blockage removing agent, such as a caustic solution like LIQUID PLUMBR® by The Clorox Company, and contaminant 104 may be a grease/hair obstruction directly lodged within vial 118 to simulate a drain blockage in a sanitary drain. The caustic consumer product 208 produces the consumer-desired effect of dislodging the grease/hair obstruction contaminant 104. The caustic consumer product 208 saponifies and dissolves the grease/hair obstruction contaminant 208 in vial 118 to produce the visible effect of dislodging the grease/hair obstruction contaminant 104.

In still other embodiments, consumer product 208 may not directly produce a sensory effect but the efficacy of consumer product 208 may be shown indirectly through use of an indicator reagent or by a surrogate for contaminant 104. Any number of consumer products may be demonstrated with collapsible demonstration apparatus 100. Examples include but are not limited to pine-oil, surfactants, solvents, and mixtures thereof. Further, in one embodiment, consumer product 208 may be contained in vial 118 and a flowable contaminant 104 may be contained in reservoir 110.

Figure 2B:
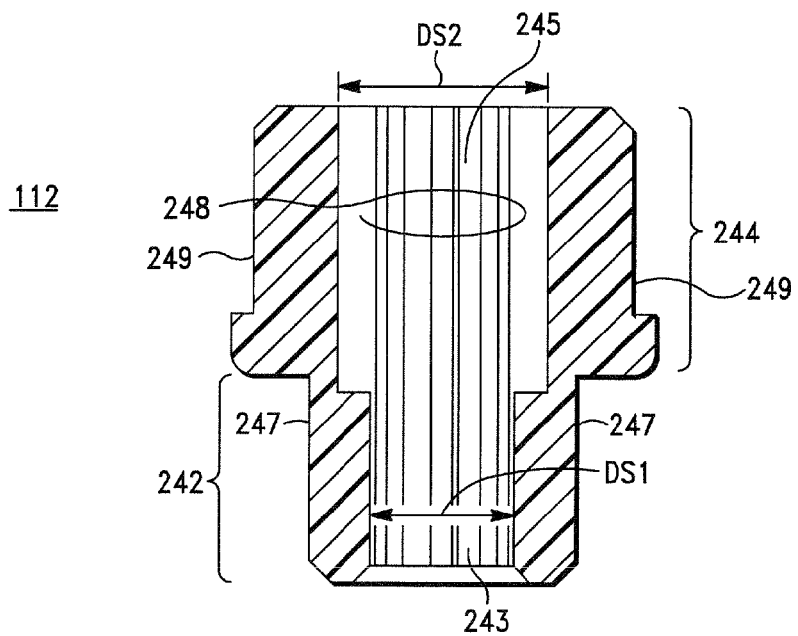
FIG. 2B shows an isolated, side cross-sectional view of a stopper of FIG. 1B.
Figure 8:
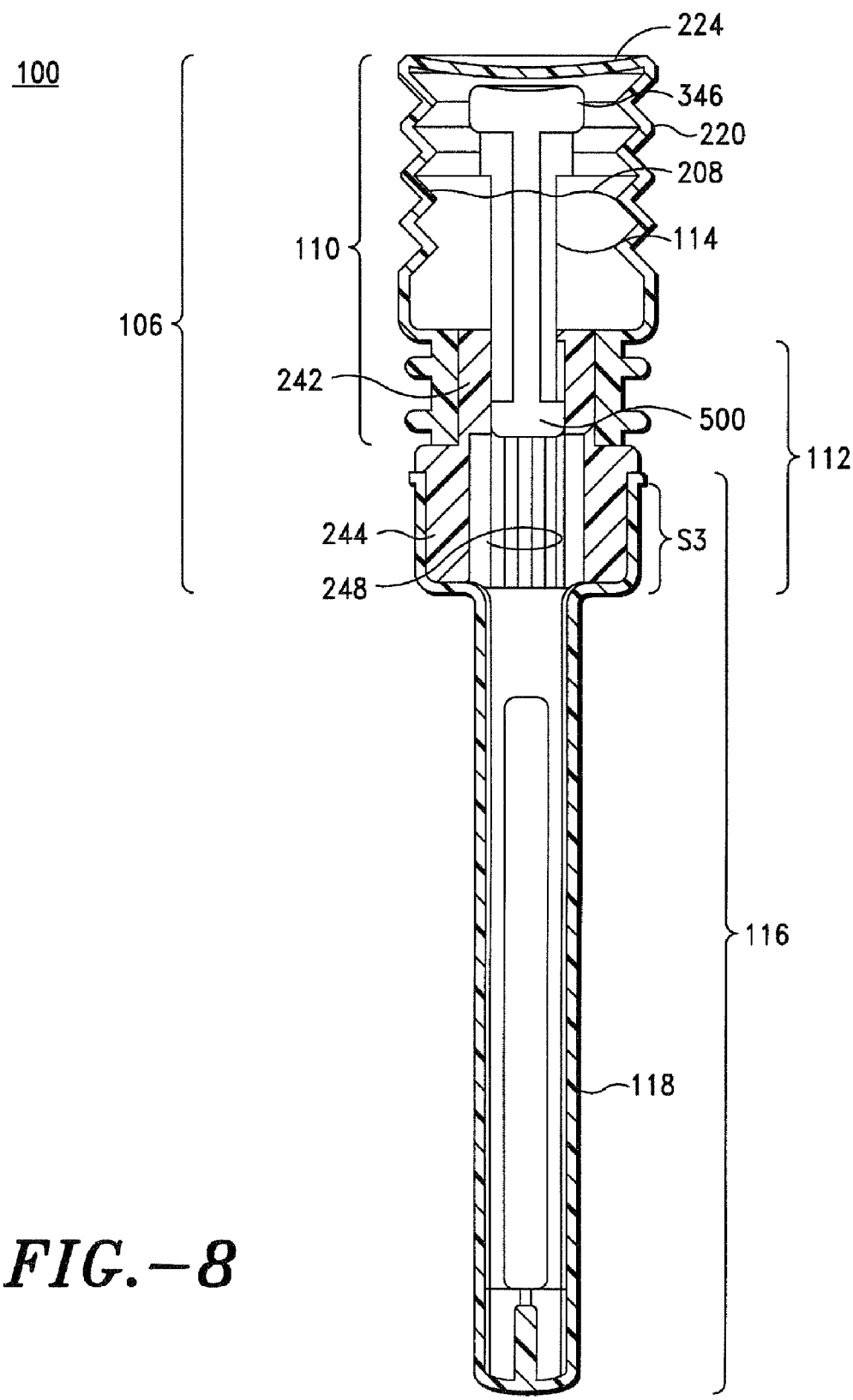
FIG. 8 shows a side cross-sectional view of the collapsible demonstration apparatus after final assembly of the top subassembly and the bottom subassembly and before activation.

FIG. 2B shows an isolated, side cross-sectional view of stopper 112 of FIG. 1B. In FIG. 2B, stopper 112 is shown in a position inverted from the position in which collapsible demonstration apparatus 100 is used with method 1600 (FIG. 16). Stopper 112 is opened at both ends and adapted to provide for through passage of a flowable material. As described more fully below with reference to FIG. 5, stopper 112 also includes an ejector keyway 248 adapted to cooperate with and slidably engage ejector 114 (FIG. 1B, see also FIG. 8).

Referring to FIG. 1B and 2B together, in one embodiment, stopper 112 includes a reservoir coupling portion 242 and a vial coupling portion 244 coupled to or integral with reservoir coupling portion 242. Reservoir coupling portion 242 and vial coupling portion 244 of stopper 112 are configured generally as cylindrical surfaces opened at both ends. As shown in FIG. 2B, in one embodiment, reservoir coupling portion 242 and vial coupling portion 244 are coupled or integrally formed together in an end-to-end fashion thereby creating a fluid communication channel through stopper 112.

Reservoir coupling portion 242 of stopper 112 defines a stopper first opening 243 having a stopper first opening diameter DS1. As described more fully below with reference to FIGS. 4A and 4B, reservoir coupling portion 242 of stopper 112 is adapted to couple with stopper top coupling portion 222 of reservoir 110 by press-fitting techniques well known to those of ordinary skill in the art. Other means of coupling reservoir 110 with stopper 112, such as adhesive or threaded, are possible.

Vial coupling portion 244 of stopper 112 defines a stopper second opening 245 having a stopper second diameter DS2. In one embodiment, stopper first opening diameter DS1 of stopper first opening 243 is less than stopper second opening diameter DS2 of stopper second opening 245, thereby creating a stepped passageway through stopper 112. As described more fully below with reference to FIG. 7, vial coupling portion 244 of stopper 112 is adapted to couple with vial 118 by press-fitting.

Figure 3:
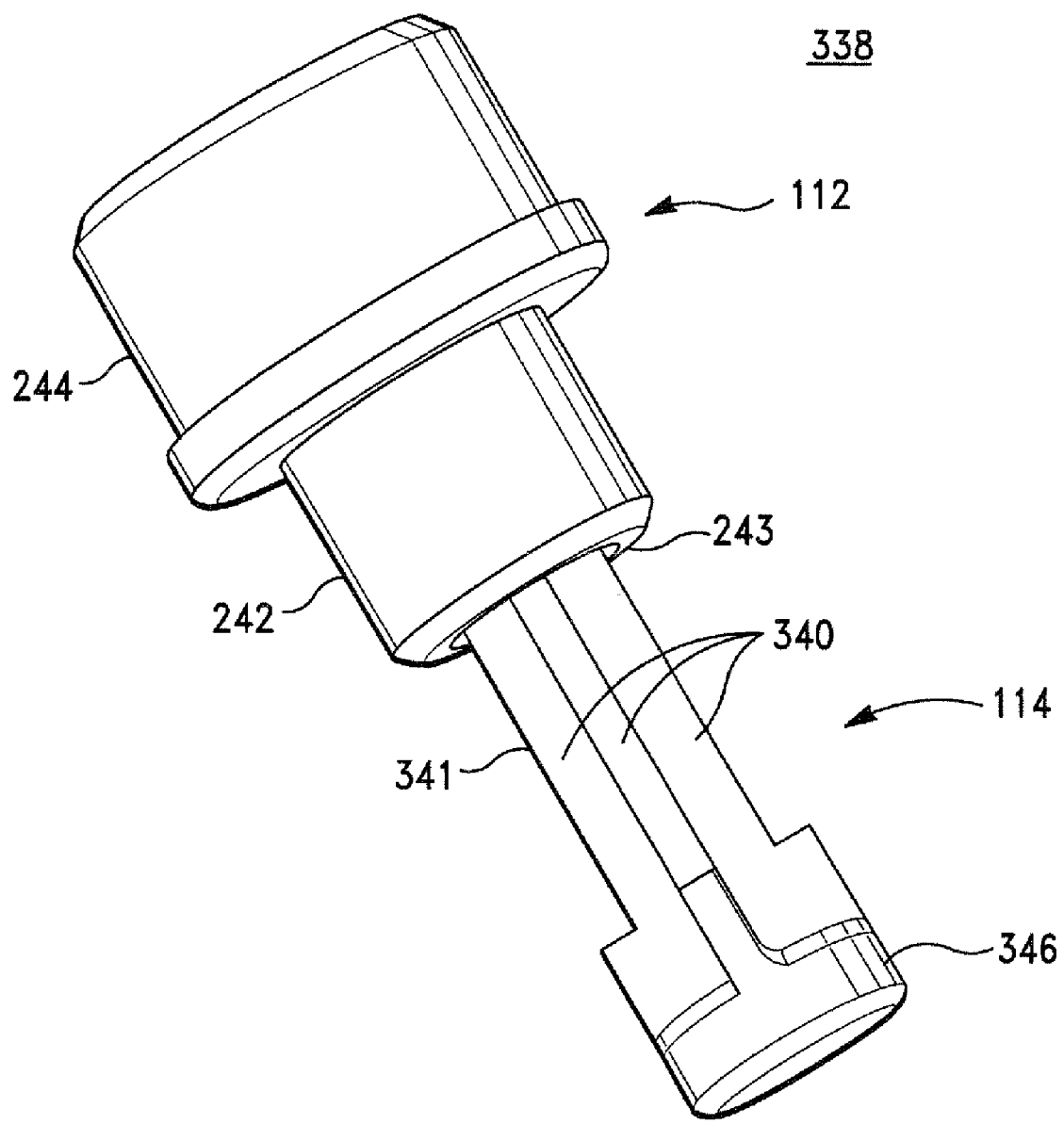
FIG. 3 shows a close-up isolated perspective view of a reservoir seal element of FIG. 1B.

FIG. 3 shows a close-up isolated perspective view of a reservoir seal element 338 of FIG. 1B. In FIG. 3, reservoir seal element 338 is shown in a position inverted from the position in which collapsible demonstration apparatus 100 is used with method 1600 (FIG. 16). Reservoir seal element 338 is formed from ejector 114 and stopper 112.

In one embodiment, and as described more fully below with reference to FIG. 5, ejector 114 includes lengthwise splines 340 that, together, are configured generally as a cruciformly shaped shaft 341 adapted to slidably engage and cooperate with ejector keyway 248 (FIG. 2B) of stopper 112. Shaft 341 of ejector 114 has a driver end 346 and a seal end 550 (FIG. 5, see also FIG. 8) opposite driver end 346.

During the assembly of reservoir seal element 338, seal end 550 (FIGS. 5 and 8) of ejector 114 is inserted through stopper first opening 243 of stopper 112. Splines 340 of shaft 341 of ejector 114 are thereby slidably engaged with keyway 248 (FIGS. 2, 5 and 8) of stopper 112 to form reservoir seal element 338. As described more fully below with reference to FIG. 5, seal end 550 of ejector 114 also forms a first seal S1 (FIG. 5) with stopper 112.

Figure 4A:
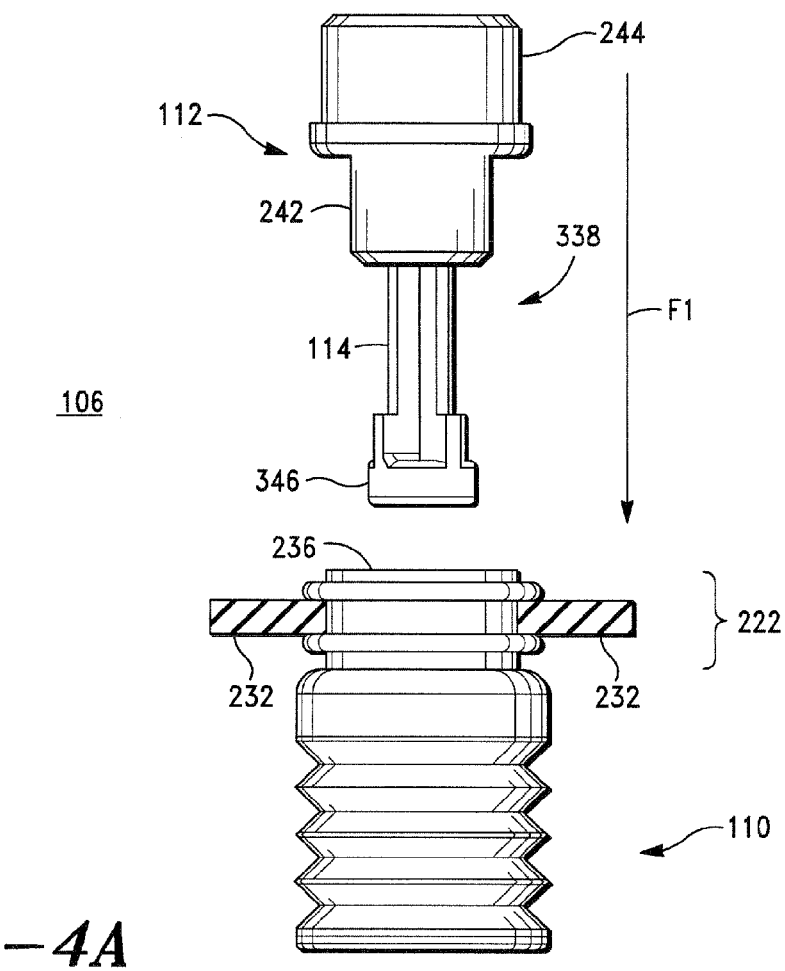
FIG. 4A is a side view of the top subassembly showing the reservoir seal element and the reservoir before assembly.
Figure 4B:
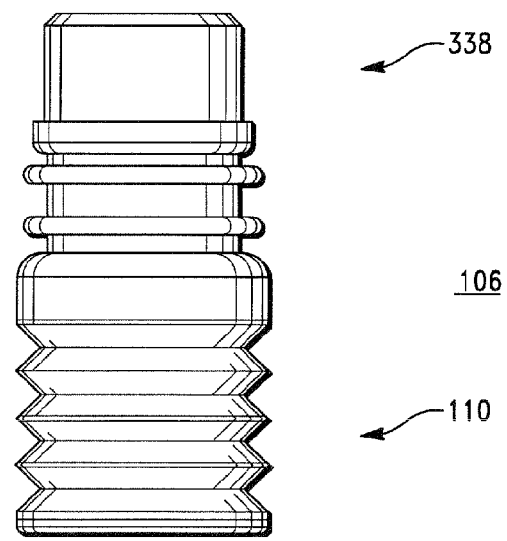
FIG. 4B is a side view of the top subassembly showing the reservoir seal element and reservoir after assembly.

As noted above with reference to FIG. 1A, top subassembly 106 is configured to contain and dispense consumer product 208. FIG. 4A is a side view of top subassembly 106 showing reservoir seal element 338 and reservoir 110 before assembly. FIG. 4B is a side view of top subassembly 106 showing reservoir seal element 338 and reservoir 110 after assembly. In FIGS. 4A and 4B, reservoir 110 and reservoir seal element 338 of top subassembly 106 are shown in a position inverted from the position in which collapsible demonstration apparatus 100 (FIG. 1A) is used with method 1600 (FIG. 16).

Referring to FIGS. 4A and 4B together, reservoir seal element 338 is coupled to reservoir 110 to form top subassembly 106 by press-fitting reservoir coupling portion 242 of stopper 112 of reservoir seal element 338 into reservoir opening 236 of reservoir 110 by application of a first assembly force, as indicated by first assembly force arrow F1. At assembly, driver end 346 of ejector 114 of reservoir seal element 338 is inserted into and through reservoir opening 236 of stopper top coupling portion 222 of stopper 112.

By application of first assembly force F1 on the end of vial coupling portion 244 of stopper 112 in a direction toward reservoir opening 236, a press-fit coupling of reservoir seal element 338 to reservoir 110 creates a second seal S2 (FIG. 5) between reservoir coupling portion 242 of reservoir seal element 338 and stopper top coupling portion 222 of reservoir 110. After assembly, top subassembly 106, formed from press-fit reservoir seal element 338 and reservoir 110 as described, appears as shown in FIG. 4B. Top subassembly 106 encloses ejector 114 and further contains consumer product 208 in a fluid-tight manner regardless of the orientation of top subassembly 106.

Figure 5:
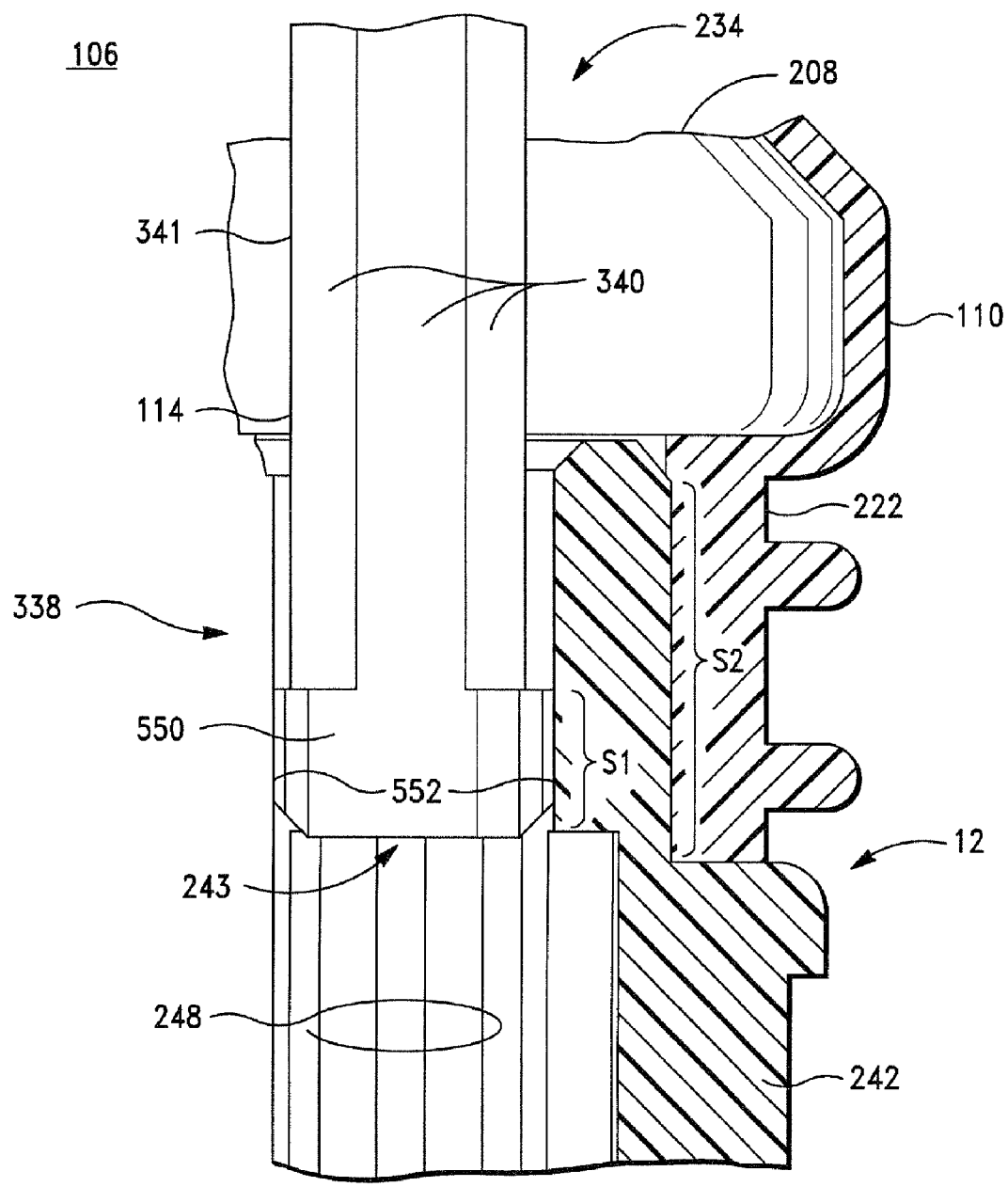
FIG. 5 shows a partial, side cross-sectional view of a top subassembly of FIG. 4B.

FIG. 5 shows a partial, side cross-sectional view of top subassembly 106 of FIG. 4B showing reservoir seal element 338 at reservoir coupling portion 242 of stopper 112. In FIG. 5, top subassembly 106 is shown in an upright position opposite the inverted position shown in FIGS. 4A and 4B, i.e., in the position in which collapsible demonstration apparatus 100 is used with method 1600 (FIG. 16). Referring to FIG. 5 and as mentioned above with reference to FIG. 3, in one embodiment ejector 114 of reservoir seal element 338 includes lengthwise splines 340 that together are configured generally as a cruciformly shaped shaft 341 adapted to slidably engage ejector keyway 248. Ejector keyway 248 acts as a guide for splines 340 of shaft 341 to direct the sliding motion of ejector 114 upward and downward from stopper 112 while stabilizing ejector 114 in its sliding motion.

As also described with reference to FIG. 3, in one embodiment, seal end 550 of ejector 114 forms first seal S1 with reservoir coupling end 242 of stopper 112. More particularly for the embodiment shown in FIG. 5, seal end 550 is configured generally as a cylindrical shaped plug or disk coupled to one end of shaft 341 opposite driver end 346 (FIG. 3, See also FIG. 8). Seal end 550 has a seal end peripheral edge 552 adapted to abuttingly engage the interior cylindrical surface of first stopper opening 243 of reservoir coupling portion 242 of stopper 112 to form the above-described first seal S1 within reservoir seal element 338.

When top subassembly 106 is positioned upright as shown in FIG. 5, flowable consumer product 208 flows to contact seal end 550 of ejector 114 of reservoir seal element 338. Further, in this position, reservoir expansion space 234 inverts to endcap 224 (FIG. 2A, not shown in FIG. 5). As noted above, after assembly, reservoir seal element 338 of top subassembly is adapted to contain and dispense consumer product 208.

Figure 6:
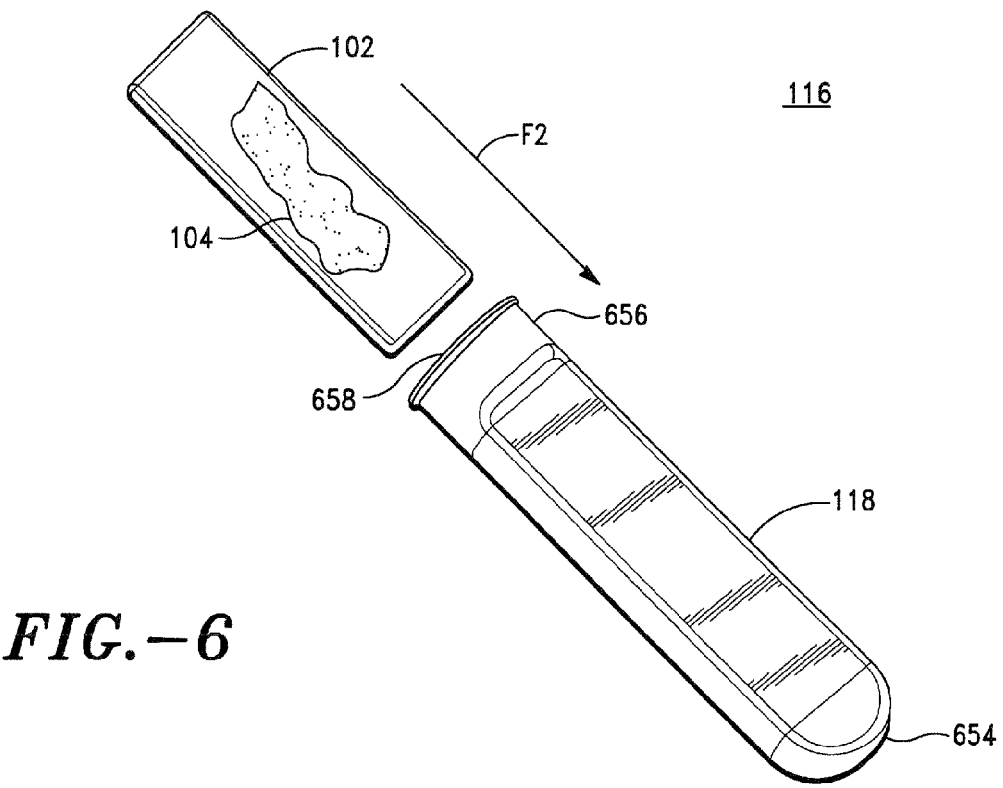
FIG. 6 shows an isolated, exploded view of the bottom subassembly of FIG. 4B.

FIG. 6 shows an isolated, exploded view of bottom subassembly 116 of FIG. 1B. Bottom subassembly 116 includes workpiece 102 having contaminant 104 thereon and vial 118 adapted to contain workpiece 102. In one embodiment, vial 118 is configured as a container having a vial closed end 654 and an stopper bottom coupling portion 656 opposite vial closed end 654 and defining a vial opening 658. During assembly, workpiece 102 is inserted through vial opening 658 and directed toward vial closed end 654 until workpiece 102 is fully contained within vial 118.

By application of a second assembly force on workpiece 102 in a direction toward vial closed end 654, as indicated by second force arrow F2 in FIG. 6 workpiece 102 is placed within vial 118. As noted above, in one embodiment, vial 118 is at least partially transparent or translucent such that workpiece 102 and, more specifically, contaminant 104 thereon is visible when collapsible demonstration apparatus 100 is fully assembled. Vial 118 may be configured to slidably receive workpiece 102.

Figure 7:
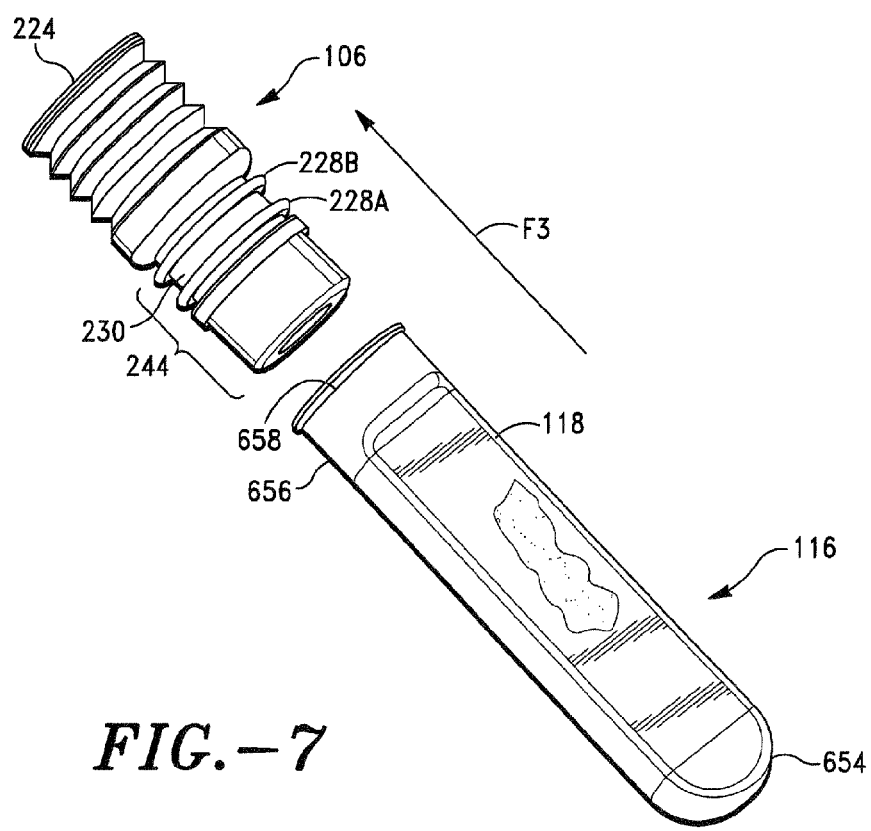
FIG. 7 shows the top subassembly and the bottom subassembly, which when assembled, to form the collapsible demonstration apparatus of FIG. 1A.

After, workpiece 102 is fully contained in vial 118 as described, bottom subassembly 116 is assembled with top subassembly 106. FIG. 7 shows the final assembly of top subassembly 106 and bottom subassembly 116 to form collapsible demonstration apparatus 100 of FIG. 1A. Referring to FIG. 7, in one embodiment, vial coupling portion 244 is configured as a cylinder having a cylindrically shaped exterior sidewall surface. Vial opening 658 of stopper bottom coupling portion of vial 118 is a circular opening having a generally cylindrically shaped interior sidewall surface adapted to receive vial coupling portion 244 of stopper 112 (FIG. 2B).

At final assembly of top subassembly 106 and bottom subassembly 116, vial coupling portion 244 of stopper 112 of top subassembly 106 is inserted into vial opening 658 of vial 118 of bottom subassembly 116. By application of a third assembly force on vial closed end 654 of vial 118 in a direction toward top subassembly 106, as indicated by third assembly force arrow F3, a press-fit coupling of vial coupling portion 244 of stopper 112 of top subassembly 106 to vial opening 658 of vial 118 of bottom subassembly 116 is established. The coupling of top subassembly 106 and bottom subassembly 116 creates a third seal S3 (FIG. 8) at the exterior sidewall surface of vial coupling portion 244 of top subassembly 106 and the interior sidewall surface of vial opening 658 of vial 118 of bottom subassembly 116.

During this assembly operation, care is taken to avoid depressing endcap 224 toward bottom subassembly 116. In one embodiment, top subassembly 106 may be held in place, as described above with reference to FIG. 2A, by inserting assembly rib structure 232 (FIG. 2A) or similar holding structure into slotted track 230 of stopper 112 formed by first ring 228A and second ring 228B. Use of assembly rib structure 232 (FIG. 2A) provides resistance against displacement of top subassembly 106 during assembly with bottom subassembly 116 and more particularly assists in avoiding depression of endcap 224 toward bottom subassembly 116.

FIG. 8 shows a side cross-sectional view of collapsible demonstration apparatus 100 after final assembly of top subassembly 106 and bottom subassembly 116 and before activation in use with method 1600 (FIG. 16). In FIG. 8, collapsible demonstration apparatus 100 is shown in an upright position, with top subassembly 106 above bottom subassembly 116. After the final assembly of top subassembly 106 with bottom subassembly 116, consumer product 208 is captured within reservoir 110 in a fluid-tight manner.

First seal S1 (see FIG. 5) between seal end 550 of ejector 114 and stopper 112 prevents flow of consumer product 208 into vial 118 of bottom subassembly 116 before activation of collapsible demonstration apparatus 100. Second seal S2 (see FIG. 5) at the press-fit coupling between reservoir coupling portion 242 of stopper 112 and stopper top coupling portion 222 of reservoir 110 prevents leakage between stopper 112 and reservoir 110 (See also FIGS. 4A and 4B). Third seal S3 at the press-fit coupling between vial coupling portion 244 of stopper 112 and stopper bottom coupling portion 656 of vial 118 of bottom subassembly 116 prevents leakage between stopper 112 and vial 118 (see also FIG. 7). Thus, after assembly collapsible demonstration apparatus 100 is an integral structure comprising top subassembly 106 enclosing reservoir seal element 338 and containing consumer product 208 sealed in a fluid-tight manner, and a bottom subassembly 116, coupled to top subassembly 106, containing workpiece 102 having contaminant 104 thereon.

Figure 9:
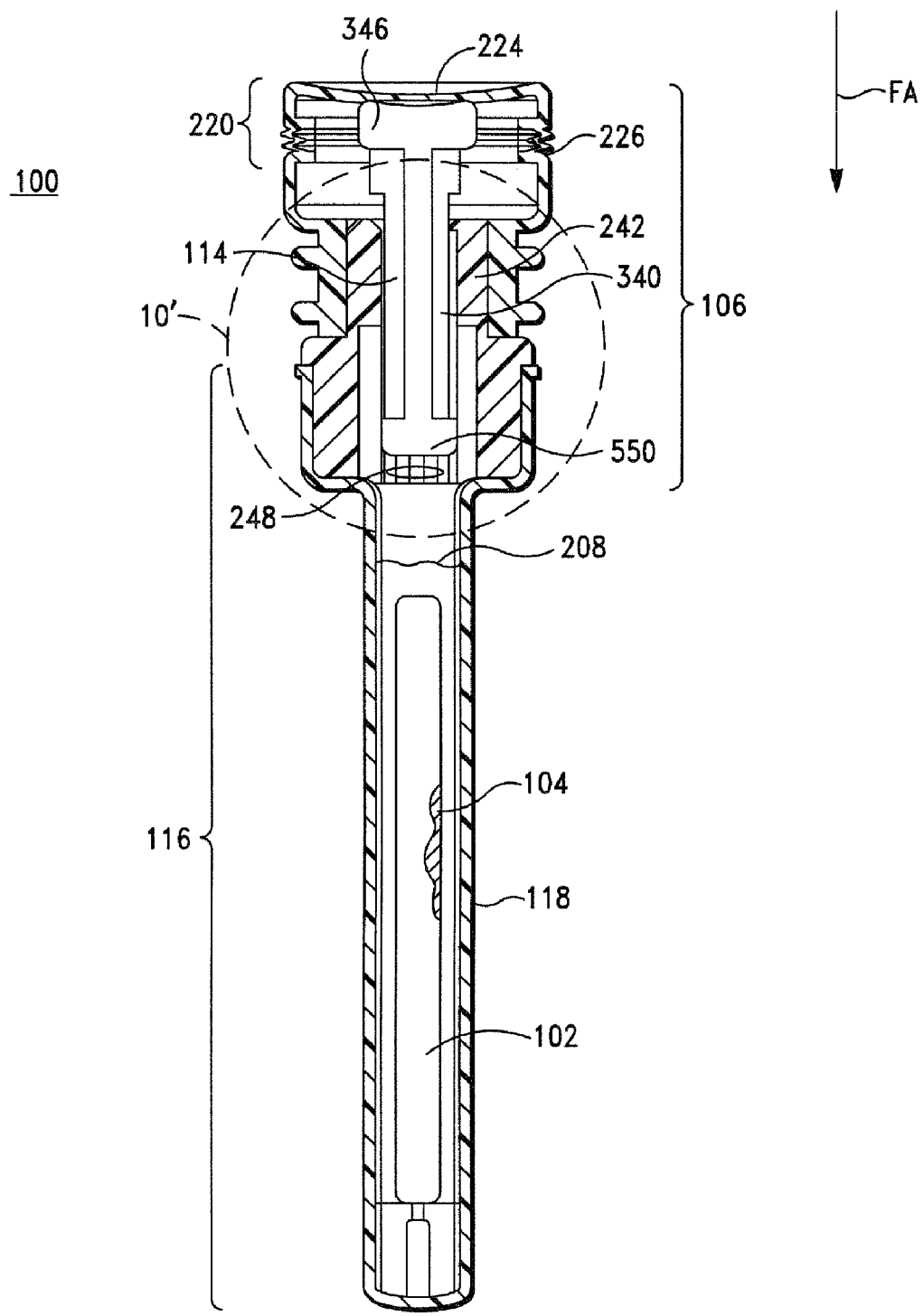
FIG. 9 shows a side cross-sectional view of the collapsible demonstration apparatus after activation.
Figure 10:
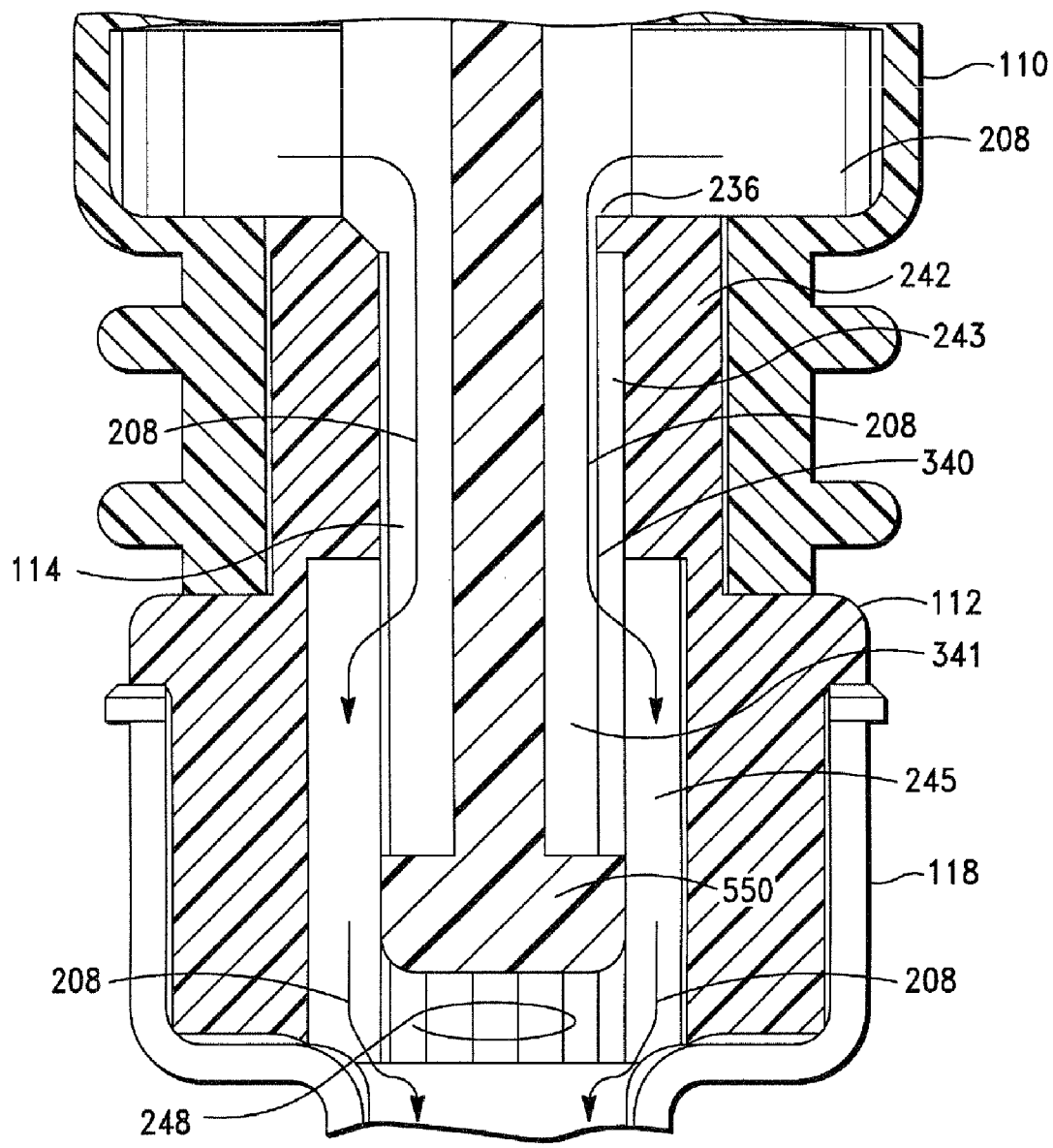
FIG. 10 shows a close-up side cross-sectional view of the highlighted portion of the collapsible demonstration apparatus shown in FIG. 9.

FIG. 9 shows a side cross-sectional view of collapsible demonstration apparatus 100 after activation in use with method 1600 (FIG. 16). FIG. 10 shows a close-up sectional view of the portion of collapsible demonstration apparatus 100 shown in FIG. 9 and indicated in dotted line 10'. In FIGS. 9 and 10, collapsible demonstration apparatus 100 is shown in an upright position, with top subassembly 106 above bottom subassembly 116. Referring to FIGS. 9 and 10 together, activation of collapsible demonstration apparatus 100 withdraws first seal S1 (FIG. 5) between seal end 550 of ejector 114 and stopper 112 and allows flow of consumer product 208 into vial 118 of bottom subassembly 116. When consumer product 208 is placed in fluid communication with workpiece 102 contained in vial 118, the efficacy of consumer product 208 for contaminant 104 on workpiece 102 may be observed.

In method 1600 (FIG. 16), fully assembled collapsible demonstration apparatus 100 is activated by application of an activation force on endcap 224 in a direction toward bottom subassembly 116, as indicated by activation force arrow FA (FIG. 9). By applying an application force, endcap 224 is depressed toward bottom subassembly 116. As noted above with reference to FIG. 2A, collapsible portion 220 is a collapsible structure that includes endcap 224 and collapsible sidewall 226 integral with endcap 224. Endcap 224 is deflectable in the direction of bottom subassembly 116 by application of force FA on endcap 224 of top subassembly 106. As also noted above with reference to FIGS. 3 and 5, ejector 114 includes splines 340 that together are configured generally as a cruciformly shaped shaft 341 that is adapted to slidably engage cooperating ejector keyway 248.

When a user of collapsible demonstration apparatus 100 depresses endcap 224 as described, collapsible sidewall 226 collapses allowing endcap 224 to contact driver end 346 of ejector 114. Reservoir expansion space 234 of reservoir 110 allows smooth and orderly depression of endcap 224 of reservoir 110 and driver end 346 of ejector 114, as the gases contained therein are compressible and expandable. The gas volume of reservoir expansion space 234 provides capacity for compression to accommodate the collapsing of collapsible sidewall 226 of reservoir 110 during activation of collapsible demonstration apparatus 100.

With further depression of endcap 224 and driver end 346, splines 340 making up shaft 341 begin to slide within ejector keyway 248 toward bottom subassembly 116. At the same time, seal end 550, coupled to shaft 341 at the end of shaft 341 opposite driver end 346, likewise begins to move toward bottom subassembly 116. With sufficient depression of endcap 224, seal end 550 clears reservoir coupling portion 242 of stopper 112 thereby withdrawing the above described first seal S1 (FIG. 5).

After first seal S1 is withdrawn by depressing endcap 224 sufficiently far toward bottom subassembly 116 to allow seal end 550 to clear reservoir coupling portion 242 of stopper 112, consumer product 208 flows from reservoir 110, through reservoir opening 236 (see also FIG. 2A), through stopper first opening 243, around cruciform shaft 341 at the spaces between splines 340, and through stopper second opening 245 into vial 118.

Figure 11A:
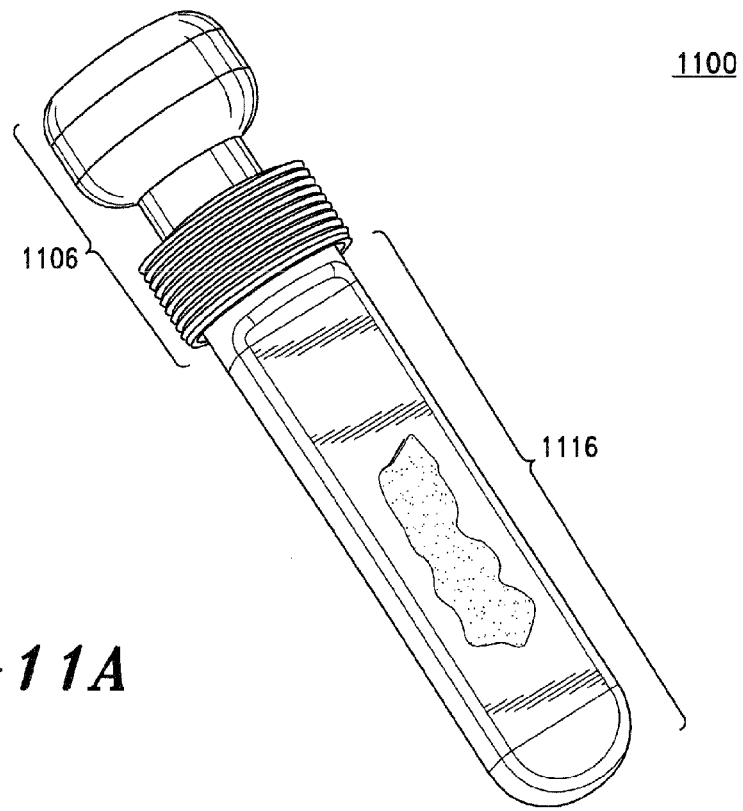
FIG. 11A shows a perspective view of a deformable demonstration apparatus in accordance with one embodiment of the present invention.

FIG. 11A shows a perspective view of a deformable demonstration apparatus 1100 in accordance with one embodiment of the present invention. Like collapsible demonstration apparatus 100 (FIG. 1A), deformable demonstration apparatus 1100 comprises a number of components that are assembled prior to use of deformable demonstration apparatus 1100 in method 1600 (FIG. 16). Deformable demonstration apparatus 1100 includes a top subassembly 1106 configured to contain and dispense a consumer product 1208 (FIG. 12) and a bottom subassembly 1116 adapted to couple, in a fluid-tight manner, with top subassembly 1106.

Figure 11B:
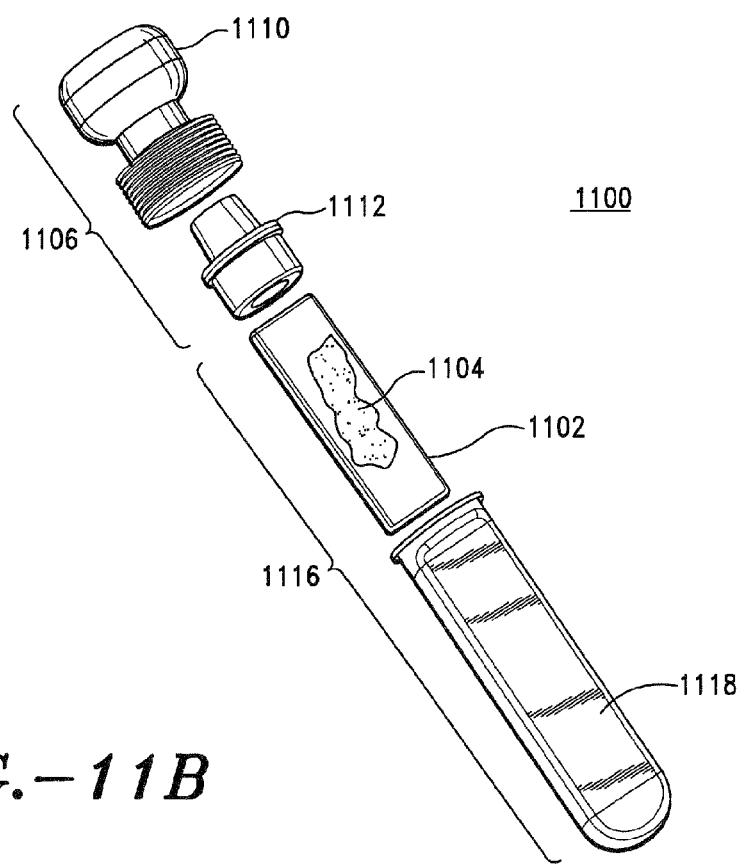
FIG. 11B shows an exploded view of the deformable demonstration apparatus of FIG. 11A.

FIG. 11B shows an exploded view of deformable demonstration apparatus 1100 of FIG. 1A. In one embodiment, top subassembly 1106 comprises a reservoir 1110 and a stopper 1112 adapted to couple, in a fluid-tight manner, with reservoir 1110. Bottom subassembly 1116 includes a vial 1118 configured to contain a workpiece 1102 having a contaminant 1104 thereon and adapted to couple, in a fluid-tight manner with stopper 1112. In one embodiment, vial 1118 is at least partially transparent or translucent such that workpiece 1102 and, more specifically, contaminant 1104 thereon, is visible when top subassembly 1106 and bottom subassembly 1116 are fully assembled to form deformable demonstration apparatus 1100.

Figure 12A:
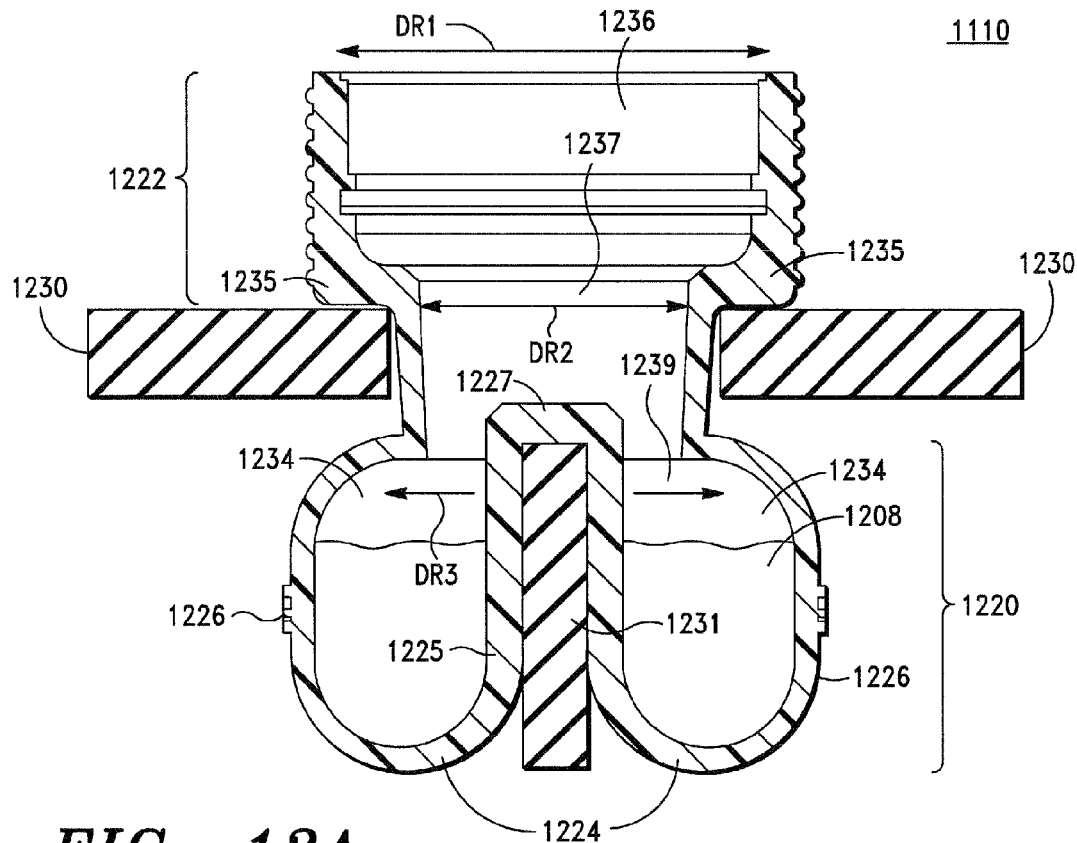
FIG. 12A shows a close-up, isolated, side cross-sectional view of a reservoir of FIG. 11B.

FIG. 12A shows a close-up, isolated, side cross-sectional view of reservoir 1110 of FIG. 11B. In FIG. 12A, reservoir 1110 is shown in a position inverted from the position in which deformable demonstration apparatus 1100 is used with method 1600 (FIG. 16). Reservoir 1110 is configured as a hollow vessel adapted to contain a flowable material.

Referring to FIGS. 11B and 12A together, in one embodiment, reservoir 1110 defines a generally cylindrically shaped surface closed at a first end and opened at an opposed second end. Reservoir 1110 includes a deformable portion 1220 and a stopper top coupling portion 1222 coupled to or integral with deformable portion 1220.

Deformable portion 1220 of reservoir 1110 defines a deformable structure that includes an endcap 1224 and a deformable sidewall 1226 coupled to or integral with endcap 1224. Endcap 1224 is configured generally as a disk having a central indent post 1225 directed inwardly toward stopper top coupling portion 1222. In one embodiment, indent post 1225 is configured as a hollow circular post-like structure coupled to or integral with endcap 1224 at one end and closed at a stopper plug 1227 at the opposite end of central indent post 1225. Deformable sidewall 1226 of deformable portion 1220 is configured generally as a bulb-like, outwardly curving, sidewall surface. As described more fully below with reference to FIG. 15, deformable sidewall 1226 is deflectable inwardly by application of a force on deformable sidewall 1226 toward indent post 1225.

Stopper top coupling portion 1222 of reservoir 1110 is configured generally as frusto-conically shaped surface opened at both ends. One end of stopper coupling portion 1222 is couple to or integral with deformable portion 1220 and the other end of stopper coupling portion defines a reservoir first opening 1236, having reservoir first opening diameter DR1.

Stopper top coupling portion 1222 tapers inwardly along the direction from reservoir first opening 1236 toward deformable portion 1220 and then necks down at a reservoir shoulder 1235 that defines a reservoir second opening 1237 having a reservoir second opening diameter DR2. Stopper top coupling portion 1222 further tapers inwardly along the direction from reservoir second opening 1237 toward deformable portion 1220 to the point where stopper top coupling portion 1222 joins with deformable portion 1220. At the point where stopper top coupling portion 1222 joins with deformable portion 1220, stopper top coupling portion 1222 defines a reservoir third opening 1239 having a reservoir third opening inside diameter DR3.

In assembling the components of deformable demonstration apparatus 1100, reservoir 1110 is inverted, i.e., reservoir first opening 1236 is positioned upwardly above endcap 1224 as shown in FIG. 12A, and partially filled with consumer product 1208. In one embodiment, during assembly and filling of reservoir 1110, a horizontally directed slotted track 1230, adapted to fit under shoulder 1235 of stopper top coupling portion 1222, provides vertical support when slotted track 1230 is temporarily inserted under shoulder 1235 of reservoir 1110. A vertically directed post track 1231 adapted to fit within the hollow interior space of indent post 1225, provides horizontal support and alignment for inverted reservoir 1110 when post track 1231 is temporarily inserted into indent post 1225.

After reservoir 1110 is partially filled with consumer product 1208, a reservoir expansion space 1234 remains in reservoir 1110. As described above with reference to FIG. 2A, consumer product 1208 has efficacy to produce a consumer-desired effect to eliminate, denature, minimize, or otherwise render harmless contaminant 1104. Also, as described, consumer product 1208 produces a humanly observable sensory effect after contacting contaminant 1104 (FIG. 11B) to decontaminate workpiece 1102 (FIG. 11B).

Figure 12B:
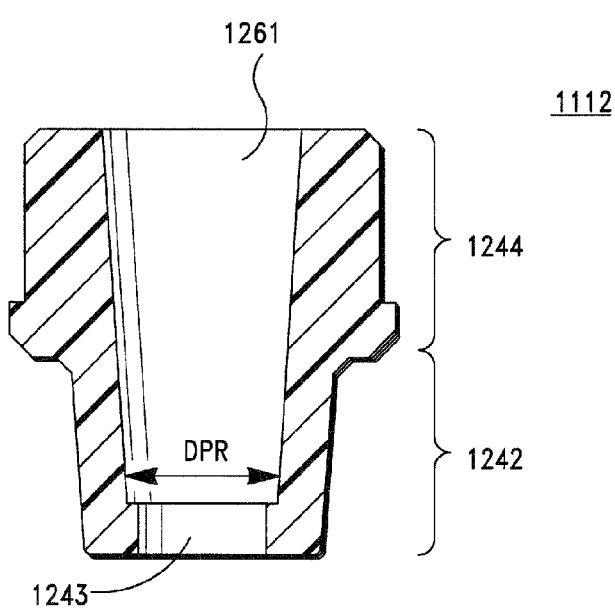
FIG. 12B shows an isolated, side cross-sectional view of a stopper of FIG. 11B.

FIG. 12B shows an isolated, side cross-sectional view of stopper 1112 of FIG. 11B. In FIG. 12B, stopper 1112 is shown in a position inverted from the position in which deformable demonstration apparatus 1100 is used with method 1600 (FIG. 16). Stopper 1112 is opened at both ends and adapted to provide for through passage of a flowable material.

Referring to FIG. 11B and 12B together, in one embodiment, stopper 1112 includes a reservoir coupling portion 1242 configured generally as frusto-conically shaped surface opened at both ends and a vial coupling portion 1244 configured generally as cylindrically shaped surface opened at both ends. As shown in FIG. 12B, in one embodiment, reservoir coupling portion 1242 and vial coupling portion 1244 are integrally formed together in an end-to-end fashion thereby creating a fluid communication channel through stopper 1112, which tapers outwardly along the direction from reservoir coupling portion 1242 to vial coupling portion 1244.

Reservoir coupling portion 1242 of stopper 1112 defines a plug receiver opening 1243 having a plug receiver opening diameter DPR. As described more fully below with reference to FIG. 14, tapering reservoir coupling portion 1242 of stopper 1112 is adapted to couple with tapering stopper top coupling portion 1222 of reservoir 1110 by press-fitting.

Vial coupling portion 1244 of stopper 1112 defines a stopper second opening 1261. As described more fully below with reference to FIG. 14, vial coupling portion 1244 of stopper 1112 is adapted to couple with a bottom coupling portion 1456 of vial 1418 (FIG. 14) by press-fitting.

Figure 13:
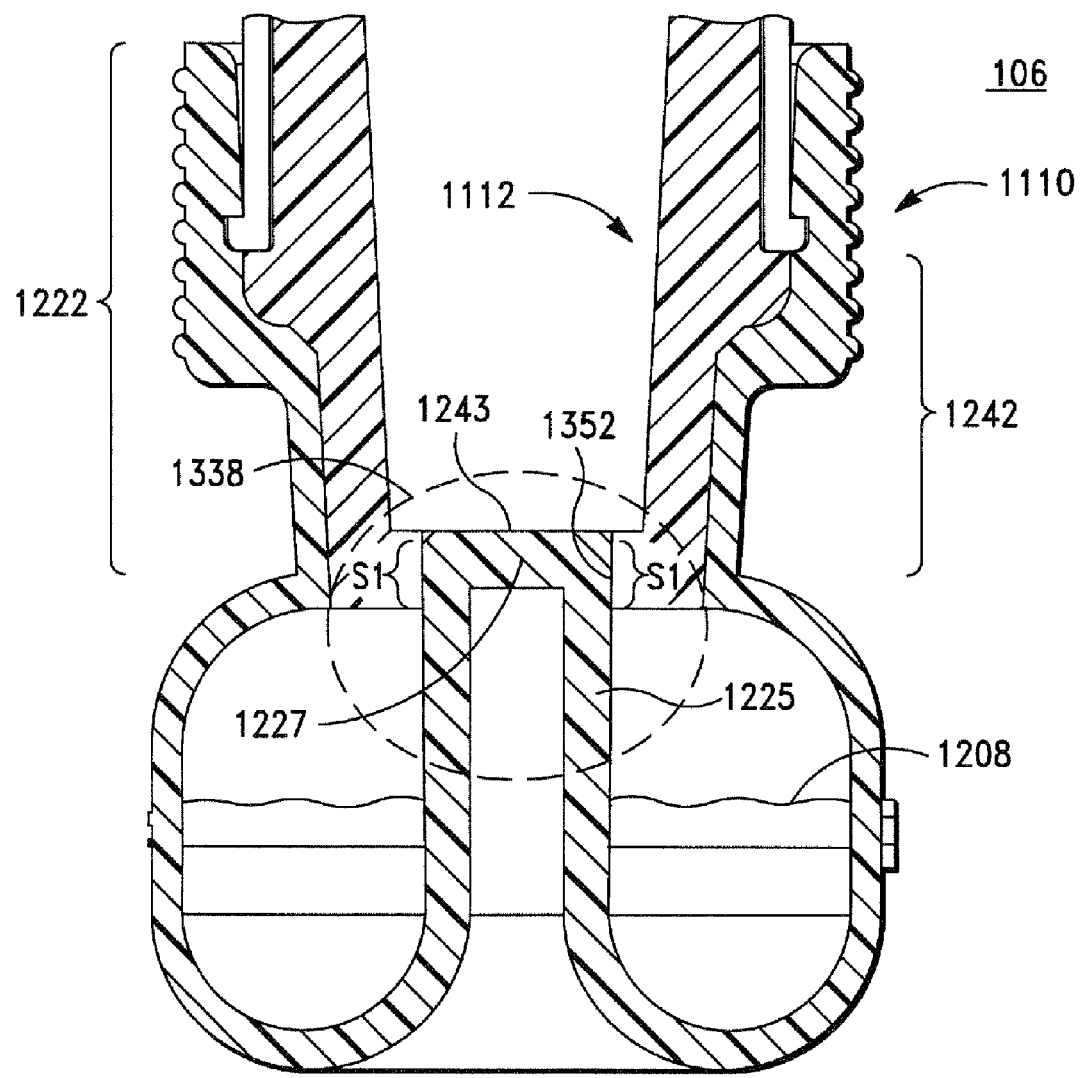
FIG. 13 shows a partial, side cross-sectional view of a top subassembly of FIG. 11B after assembly of a reservoir and a stopper to form a reservoir seal element.

FIG. 13 shows a partial, side cross-sectional view of top subassembly 1106 of FIG. 1B after assembly of reservoir 1110 and stopper 1112 to form a reservoir seal element 1338. In FIG. 13, top subassembly is shown in a position inverted from the position in which deformable demonstration apparatus 1100 is used with method 1600 (FIG. 16). Reservoir seal element 1338 comprises stopper plug 1227 of indent post 1225 of reservoir 1110 and plug receiver opening 1243 (see also FIG. 12B) of reservoir coupling portion 1242 of stopper 111. Stopper plug 1227 and plug receiver opening 1243 form first seal S1.

More particularly, for the embodiment shown in FIG. 13, stopper plug 1227 is configured generally as the closed, blunt end of the cylindrically shaped indent post 1225 (see also FIG. 12B). Stopper plug 1227 has a seal peripheral edge 1352 adapted to abuttingly engage the interior cylindrical surface of plug receiver opening 1243 (see also FIG. 12B) of reservoir coupling portion 1242 of stopper 1112 to form first seal S1. Said simply, stopper plug 1227 fits within plug receiver opening 1243 to form first seal S1 when stopper 1112 is coupled to reservoir 1110 by press-fit in a manner similar to that described above with reference to FIGS. 4A and 4B for collapsible demonstration apparatus 100.

Figure 14:
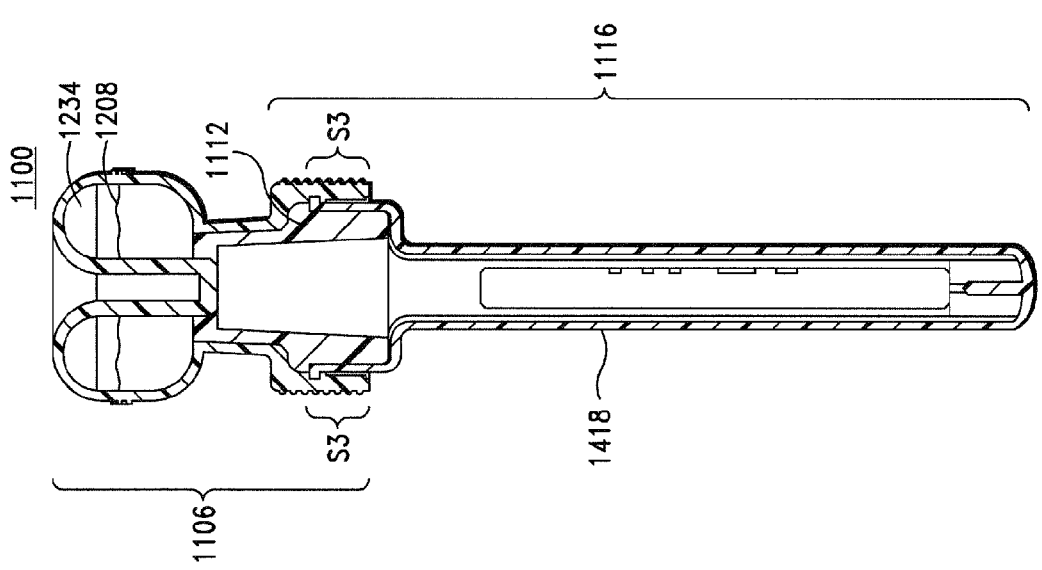
FIG. 14 shows a side cross-sectional view of the deformable demonstration apparatus after final assembly of the top subassembly with the bottom subassembly and before activation.

FIG. 14 shows a side cross-sectional view of deformable demonstration apparatus 1100 after final assembly of top subassembly 1106 with bottom subassembly 1116 and before activation of deformable demonstration apparatus 1100. In FIG. 14, deformable demonstration apparatus 1100 is shown in an upright position, with top subassembly 1106 above bottom subassembly 1116.

Referring to FIG. 14, in one embodiment bottom subassembly 1116 is configured identically to bottom subassembly 116 of collapsible demonstration apparatus 100 (See FIG. 6) and so is not described further here. Vial 1418 of bottom subassembly 1116 is coupled with stopper 1112 of top subassembly 1106 in a manner similar to that described above for collapsible demonstration apparatus 100 (FIG. 1B). However, with deformable demonstration apparatus 1100, vial 1418 is press-fitted with the outside surface of stopper 1112 as shown, rather than with the inside surface of stopper 1112 as in collapsible demonstration apparatus 100. The press-fit between bottom subassembly 1106 and top subassembly 1116 forms a third fluid seal S3 that prevents leakage of consumer product 1208 between top subassembly 1106 and bottom subassembly 1116.

After the final assembly of top subassembly 1106 with bottom subassembly 1116, consumer product 1208 is captured within reservoir 1110 in a fluid-tight manner. Also, first seal S1 at reservoir seal element 1338 (FIG. 13), formed from stopper 1112 and reservoir 1110, plugs flow of consumer product 1208 from reservoir 1110 through the tapered passageway of stopper 1112.

Figure 15:
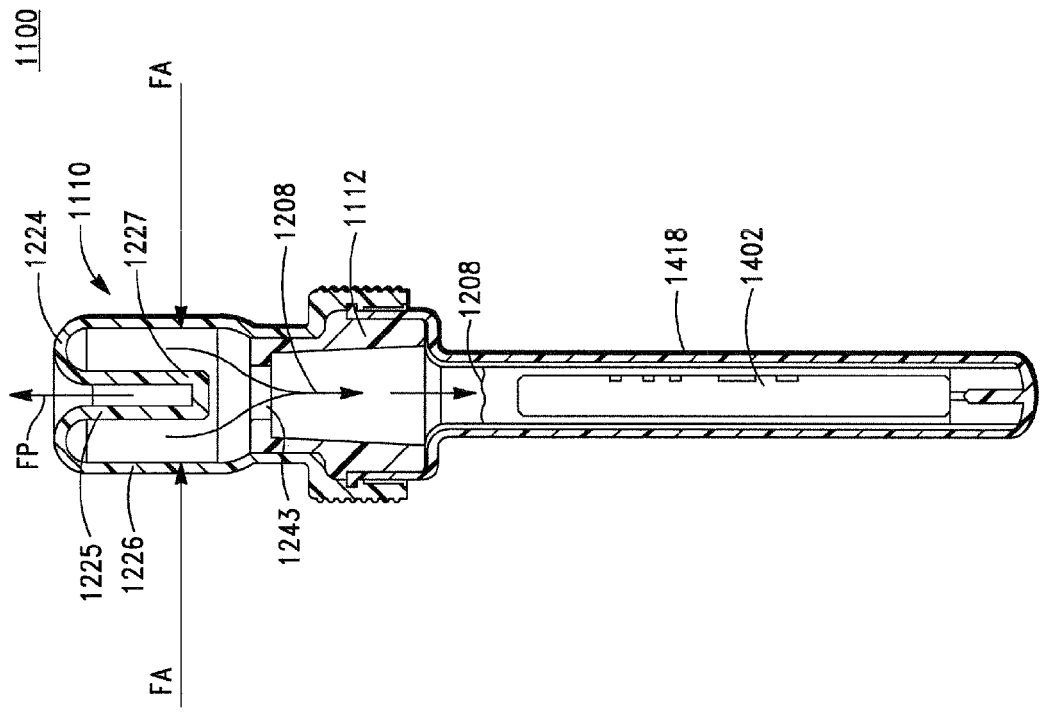
FIG. 15 shows a side cross-sectional view of the deformable demonstration apparatus after activation.

FIG. 15 shows a side cross-sectional view of deformable demonstration apparatus 1100 after activation in use with method 1600 (FIG. 16). In FIG. 15, deformable demonstration apparatus 1100 is shown in an upright position. Referring to FIG. 15, fully assembled deformable demonstration apparatus 1100 is activated by application of an activation force on deformable sidewall 1226 of reservoir 1110 as indicated by activation force arrows FA. Activation force FA is applied by a user at opposing portions of deformable sidewall 1226 in a pinching motion. Care is taken to avoid supplying application force FA on deformable sidewall 1226 before activation of deformable demonstration apparatus 1100 is intended.

As noted above with reference to FIG. 12A, deformable sidewall 1226 is deflectable in a direction toward indent post 1225 of reservoir 1110. By applying application force FA, deformable sidewall 1226 is deflected inwardly toward indent post 1225 of reservoir 1110. Reservoir expansion space 1234 (FIG. 14) of reservoir 1110 allows smooth and orderly deflection of deformable sidewall 1226.

Since indent post 1225 is integral with or coupled to deformable sidewall 1226, as deformable sidewall 1226 deflects inwardly, indent post lifts upwardly toward endcap 1224, as indicated by post force arrow FP. As indent post lifts upwardly in response to post force FP, stopper plug 1227 at the end of indent post 1225 lifts from plug receiver opening 1243 of stopper 1112 thereby withdrawing first seal S1 (FIG. 13) therebetween.

As first seal S1 between reservoir 1110 and stopper 1112 is withdrawn, consumer product 1208 flows from reservoir 1110, through plug receiver opening 1243 of stopper 112, through the passage way in stopper 1112, and into vial 1418. Consumer product 1208 contacts workpiece 1402 in vial 1418 and demonstrates a consumer-desired effect.

A method 1600 for demonstrating the efficacy of a consumer product to produce a consumer-desired effect is now described. FIG. 16 shows a process flow diagram for Method 1600. Referring to FIGS. 1A, 11A, and 16, in method 1600, a user of method 1600 commences execution at a start operation 1602 that begins the demonstration of the efficacy of a consumer product using collapsible demonstration apparatus 100 or deformable demonstration apparatus 1100.

Start operation 1602 transfers assemble/pre-assemble apparatus operation 1604. When it is stated herein that a first operation transfers to a second operation, those of skill in the art understand that the first operation is completed and the second operation is started. In operation 1604, collapsible demonstration apparatus 100 or deformable demonstration apparatus 100 (demonstration apparatus) is assembled as described above. Alternatively, demonstration apparatus is pre-assembled by others and operation 1604 is not preformed by the user of method 1600. After demonstration apparatus is assembled or pre-assembled, operation 1604 of method 1600 transfers to educate and inform consumer operation 1606.

In operation 1606, a user of Method 1600 educates and informs current or potential consumers of consumer product 208 or 1208 described above, (herinafter consumer product), about the nature of the demonstration, the contaminant, and the consumer-desired effect of the consumer product on the contaminant.

A user of method 1600 is typically a salesperson for the consumer product or a wholesale or retail vendor of the consumer product who executes method 1600 to promote sales of and distribute information about the consumer product among their current or potential customers or consumers. Method 1600 is typically executed before a live audience where promotional and education materials, such as informational hand-outs, video material, consumer product samples or give-aways, instructions for the proper use of the consumer product, consumer product efficacy claims, pricing and data sheets, contaminant detecting or testing devises, etc. are distributed to potential customers or consumers of the consumer product.

These materials may be contained in a kit designed for use with Method 1600. The kit may be supplied to the salesperson or vendor of the consumer product before commencement of Method 1600. The kit may contain a plurality of demonstration apparatuses, a plurality of alternate demonstration apparatuses containing a competing consumer product having lower efficacy, instructions to the salesperson/vendor on the proper use of the demonstration apparatus, and scripts or props for use by the salesperson/vendor. The kit is intended as a promotional tool and as a complete consumer product system that provides consumers with tools for understanding, detecting, removing, and preventing the contaminants on which the consumer product is efficacious. After the consumer or customer is informed and educated, operation 1606 of method 1600 transfer to circulate demonstration apparatus operation 1608.

In operation 1608, the demonstration apparatus may be circulated among the consumer audience members to closely view the demonstration apparatus before activation to determine the state of the workpiece and contaminant. Operation 1608 is optional and care is taken to avoid early activation of the demonstration apparatus, as noted above with reference to FIG. 7. Alternatively, the demonstration apparatus before activating may be shown to the consumer audience by other means such as video projection. After the demonstration apparatus is circulated, operation 1608 of method 1600 transfer to activate demonstration apparatus operation 1610.

In operation 1610, the demonstration apparatus is activated as described above with reference to FIGS. 9 and 15. The efficacy of the consumer product on the contaminant is demonstrated as described above. The user of method 1600 may inform the audience of the results of the activation and may provide additional promotional and educational material about the consumer product. After the demonstration apparatus is activated, operation 1610 transfers to circulated activated demonstration apparatus operation 1612.

In operation 1612, the user of method 1600 may circulate the activated demonstration apparatus. The consumer product has at this time acted efficaciously on the contaminant to produce the consumer-desired effect. The audience members may closely observe the results of contacting the consumer product with the contaminant. Since, the demonstration apparatus is self-contained and fluid-tight after activation, no consumer product contacts the audience members during operation 1612. After the activated demonstration apparatus has been circulated, Operation 1612 transfer to retrieve and dispose activated demonstration apparatus operation 1614.

In operation 1614, the activated demonstration apparatus is retrieved from circulation and properly disposed by the user of method 1600. After activated demonstration apparatus is retrieved and properly disposed, the demonstration of the efficacy of the consumer product to produce the consumer-desired effect is complete. Operation 1614 transfers to end operation 1616 where method 1600 ends.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself. For example other types of reservoir seal elements such as fragible valves or splinter packs, well know in the art, may be used to contain the consumer product in the apparatus reservoir prior to activation. Other means of withdrawing the seal to release the consumer product, beyond those described in specific embodiment are also well know in the art and may be alternately utilized.

As such, these changes and modifications are properly, equitably, and intended to be, within the full range of equivalence of the following claims.

We claim:

1. A demonstration apparatus comprising:
   a top subassembly comprising:
      a reservoir; and
      a flowable consumer product contained in said reservoir;
   a bottom subassembly comprising:
      a vial; and
      a contaminant contained in said vial;
   a reservoir seal element comprising a sidewall and coupled to said top subassembly in a fluid-tight manner and coupled to said bottom subassembly in a fluid-tight manner;
   wherein said reservoir seal element forms a first seal preventing flow of said consumer product into said vial; and
   wherein said consumer product has efficacy to produce an observable consumer-desired effect on said contaminant.

2. The demonstration apparatus of claim 1 wherein said reservoir comprises:
   a collapsible sidewall; and
   an endcap coupled to said collapsible sidewall.

3. The demonstration apparatus of claim 1 wherein said reservoir seal element comprises:
   a stopper having an ejector keyway, a stopper first opening, and a stopper second opening opposite said stopper first opening;
   wherein a stopper first opening diameter of said stopper first opening is less than a stopper second opening diameter of said stopper second opening;
   an ejector having splines forming a shaft adapted to slidably engage said keyway, said shaft having a driver end and a seal end opposite said driver end; and
   wherein said seal end of said shaft and said stopper first opening form said first seal.

4. The demonstration apparatus of claim 3 wherein said first seal is withdrawn when said demonstration apparatus is activated by application of an activation force on said endcap of said reservoir, whereby said consumer product produces said observable consumer-desired effect on said contaminant.

5. The demonstration apparatus of claim 1 wherein said observable consumer-desired effect is directly observable by an observation selected from the group consisting of visual, auditory, olfactory, and tactile.

6. The demonstration apparatus of claim 1 wherein said observable consumer effect is indirectly observable through use of a reagent.

7. The demonstration apparatus of claim 1 wherein said observable consumer effect is indirectly observable through use of a surrogate.

8. The demonstration apparatus of claim 1 wherein said vial is at least partially transparent or translucent.

9. The demonstration apparatus of claim 1 wherein said consumer product comprises a caustic solution and said contaminant comprises a grease/hair obstruction lodged within said vial.

10. The demonstration apparatus of claim 1 further comprising a workpiece contained in said vial, said workpiece having said contaminant thereon.

11. The demonstration apparatus of claim 10 wherein said consumer product comprises an oxidizing solution, said workpiece comprises hardened grout, and said contaminant comprises a mold stain.

12. The demonstration apparatus of claim 1 wherein said reservoir comprises:
    a deformable sidewall;
    an endcap coupled to said deformable sidewall; and
    an indent post coupled to said endcap at a first end of said indent post, said indent post having a stopper plug at an end opposite said first end of said indent post.

13. The demonstration apparatus of claim 12 wherein said reservoir seal element comprises:
    a stopper having a plug receiver opening; and
    wherein said plug receiver opening of said stopper and said stopper plug of said reservoir form said first seal.

14. The demonstration apparatus of claim 13 wherein said first seal is withdrawn when said demonstration apparatus is activated by application of an activation force on said deformable sidewall, whereby said consumer product produces said observable consumer-desired effect on said contaminant.

15. A demonstration apparatus comprising:
    a top subassembly comprising
       a reservoir wherein said reservoir contains a consumer product having efficacy to produce a consumer-desired effect;
    a bottom subassembly comprising
       a vial; and
       a contaminant;
    a reservoir seal element comprising a reservoir coupling portion and a vial coupling portion, wherein said reservoir coupling portion is coupled to said top subassembly and said vial coupling portion is coupled to said bottom subassembly.

16. The demonstration apparatus of claim 15 whereupon activation of said demonstration apparatus, said consumer product contacts said contaminant to produce said consumer-desired effect.

17. A method for demonstrating the efficacy of a consumer product comprising:
    providing said demonstration apparatus of claim 1;
    educating and informing consumers about said demonstration apparatus, said contaminant, and said observable consumer-desired effect of said consumer product on said contaminant;
    activating said demonstration apparatus to produce said observable consumer-desired effect on said contaminant;
    circulating said demonstration apparatus among said consumers after activation; and
    retrieving and disposing said demonstration apparatus.

18. The method of claim 17 wherein said educating and informing consumers comprises providing material selected from the group consisting of: informational hand-outs, video material, consumer product samples, give-aways, instructions for the proper use of the consumer product, consumer product efficacy claims, pricing and data sheets, contaminant detecting and testing devices.

19. The method of claim 17 further comprising the steps of:
    preassembling said demonstration apparatus and
    circulating said demonstration apparatus among said consumers before activation.

20. A kit for use with a method for demonstrating the efficacy of a consumer product comprising:
    a plurality of demonstration apparatuses of claim 1.

21. The kit of claim 20 further comprising:
    instructions in the use and proper disposal of said demonstration apparatuses;
    a plurality of alternate demonstration apparatuses containing a competing consumer product having lower efficacy to produce said observable consumer-desired effect on said contaminant;
    informational and educational materials;
    promotional materials; and
    consumer product samples.

* * * * *